Figure 1:
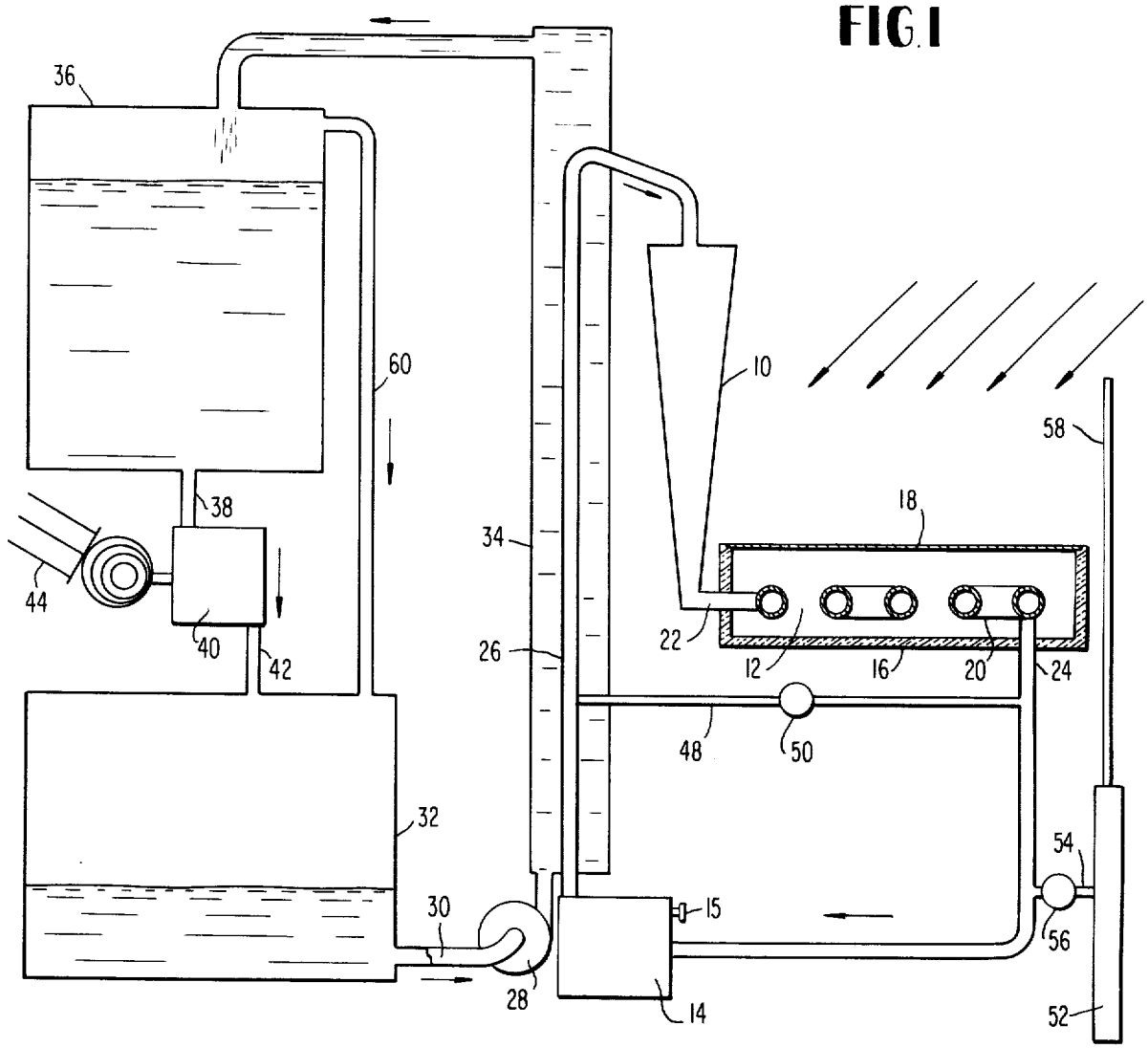

United States Patent
Glickman

[11] 3,903,700
[45] Sept. 9, 1975

[54] SUNSHINE HYDRO ELECTRICITY

[76] Inventor: Leonard Glickman, 3001 N. Bay Rd., Miami Beach, Fla. 33140

[22] Filed: Dec. 20, 1973

[21] Appl. No.: 426,529

[52] U.S. Cl. ................................ 60/641; 126/270
[51] Int. Cl. ............................................. F03g 7/00
[58] Field of Search ............... 60/641, 659; 122/32; 126/270, 271

[56] References Cited
UNITED STATES PATENTS

| | | | |
|---|---|---|---|
| 1,101,001 | 6/1914 | Willsie | 60/641 |
| 1,217,165 | 2/1917 | Fessenden | 60/641 |
| 1,479,923 | 1/1924 | Moreau | 126/270 |
| 3,299,589 | 1/1967 | Hay | 126/270 UX |
| 3,435,617 | 4/1969 | Wagle | 60/659 X |

Primary Examiner—Martin P. Schwadron
Assistant Examiner—H. Burks, Sr.
Attorney, Agent, or Firm—LeBlanc & Shur

[57] ABSTRACT

Disclosed is a solar heat generator having a plurality of pipes therein carrying an expansible fluid supplied from a fluid storage tank to a motor. The fluid is heated in the solar heat generator by the sun's energy and expands and pressurizes to drive the motor which, in turn, drives a water pump for pumping water from a lower reservoir to an upper reservoir. The gas from the motor is returned to the fluid storage tank through a heat exchanger which places the fluid in heat exchange relation with the water pumped from the lower reservoir to the upper reservoir. A hydro-electric generator is located at an elevation below the upper reservoir and is driven by water flowing from the upper reservoir to the lower reservoir to generate electricity. An overflow line also communicates between the upper and lower reservoirs. A relief conduit and valve communicates between the heater and the heat exchanger to avoid overpressurization of the system. A heat shield is utilized to shield the heater from the sun's rays in response to a predetermined pressure in the system.

4 Claims, 2 Drawing Figures

PATENTED SEP 9 1975　　　　　3,903,700

SUNSHINE HYDRO ELECTRICITY

The present invention relates to apparatus and methods for converting solar energy into electrical energy and particularly relates to the generation of hydro-electricity from solar energy.

Various devices have been proposed and constructed in the past for converting the heat energy from the sun to electrical energy and in fact attention is being increasingly focused on such devices, in view of the world energy crisis. One such device is described and illustrated in U.S. Pat. No. 2,969,637. As disclosed in that patent, a fluid flows through a solar heat accumulator where it is heated and expanded and thereafter passed through a turbine. The turbine drives an electrical generator which produces electricity. The heated fluid passes through a condenser wherein the heat extracted from the fluid returning to the reservoir is stored in water which is periodically supplied to the solar heat accumulator during periods when the solar energy is interrupted. A system of this type, however, appears to have a very low efficiency particularly since the heat stored in the water, in anticipation of an interruption of the solar energy, is readily dissipated. Also, the large number of pumps and motors in the system disclosed in that patent, necessary to operate that system, would appear to utilize a large portion of the electrical energy produced whereby the system appears only marginally practical or economical.

The present invention provides a solar powered electrical generating system which minimizes or eliminates the foregoing and other problems associated with the prior solar electrical generating systems and provides a novel and improved solar hydro-electrical generating system having various advantages in construction and mode of operation and use in comparison with such prior systems. Particularly, the present invention provides a solar hydro-electric generating system comprised of a solar heat generator in the form of a closed container having a plurality of interconnected pipes running therethrough and containing an expansible fluid received from a storage tank. The fluid is heated by the energy derived from the sun shining onto the container and pipes and expands the fluid in the pipes to drive a motor. The motor, in turn, drives a water pump which lies in communication between a lower water reservoir and an upper reservoir for pumping water from the lower reservoir to the upper reservoir. A hydro-electric generator lies at an elevation below the upper reservoir and water flowing from the upper reservoir to the lower reservoir drives the generator thereby generating electricity.

In addition to the foregoing, a further feature of the present invention includes the utilization of the water being pumped from the lower reservoir to the upper reservoir as the cooling medium for cooling the expansible fluid from the motor upon return of such fluid to the fluid storage tank. Particularly, the return conduit for the expansible fluid from the motor lies in heat exchange relation with water conduit through which water is pumped from the lower to the upper reservoir. A further feature of the present invention resides in the use of the expansible fluid storage tank to provide pressure sufficient to maintain such fluid in the solar heat generator pressurized to drive the motor. A still further feature of the present invention resides in the use of a sun shield to limit the amount of heat and pressure build-up in the solar heat generator. The sun shield is automatically responsive to a predetermined pressure in the solar heat generator to shield the solar heat generator from the sun's rays thereby to decrease the amount of heat energy absorbed therein. An even further feature hereof resides in the utilization of a pressure relief conduit and valve for transfer of the expansible fluid directly from the heat generator to the heat exchanger in response to high system pressure to avoid overpressurizing the system.

From the foregoing generalized description of the present invention, it will be appreciated that the generation of hydro-electricity is accomplished by an extremely efficient system. For example, ancillary pumps, motors, generators, etc. are not utilized or necessary in order to operate the system. Furthermore, the generation of hydro-electricity is constant, notwithstanding periods during which solar energy is interrupted. That is, the upper reservoir is sized such that a supply of water is maintained therein for the generation of hydro-electricity for the longest period in which it can be anticipated that the solar energy would be interrupted. The energy for driving the generator is thus stored in the level of the upper reservoir above the lower reservoir and consequently no losses are incurred during periods when the sun's energy is interrupted. Furthermore, the present invention utilizes a fluid of the type which generates a large pressure difference for relatively small temperature differentials. Such characteristics are typified by ammonia.

Accordingly, it is a primary object of the present invention to provide a novel and improved system for converting solar energy to hydro-electrical energy.

It is another object of the present invention to provide a novel and improved system for converting solar energy to hydro-electric energy wherein the generation of electricity is maintained constant notwithstanding interruption of the solar energy over extended intervals.

It is still another object of the present invention to provide a novel and improved system for generating hydro-electricity from solar energy which is extremely efficient and safe in operation.

It is a further object of the present invention to provide a novel and improved method for generating electrical energy from solar energy.

Figure 2:
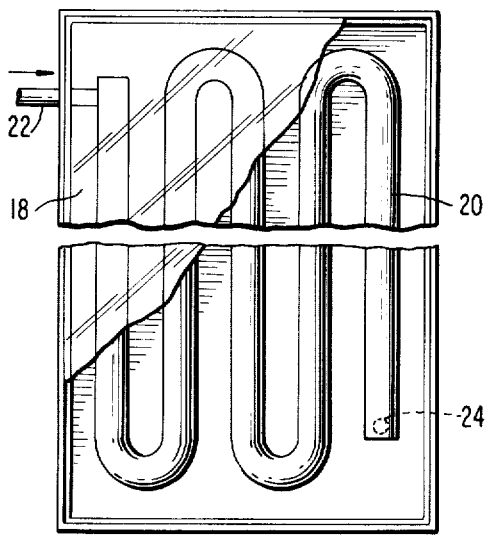

These and further objects and advantages of the present invention will become more apparent upon reference to the following specification, appended claims and drawings wherein:

FIG. 1 is a diagrammatic illustration of a system for converting solar energy into electrical energy and constructed in accordance with the present invention; and FIG. 2 is a plan view of the solar heater utilized in the system illustrated in FIG. 1.

Referring now to the drawings, particularly to FIG. 1, there is illustrated a storage tank 10 for containing an expansible fluid, a solar heater or heat generator 12 and a motor, preferably a turbine 14, by which the energy derived from the sun's rays is converted into mechanical movement necessary to the generation of hydro-electricity as amplified below. The solar heater 12 comprises a sealed housing 16 which is preferably insulated along its bottom and sides to preclude any substantial heat dissipation through the housing to its surrounds. The upper face of housing 16 is provided with a glass or other type of conductive material 18 through which the sun's rays may penetrate. Preferably nonreflecting glass or thin metal is utilized. Within housing 16, there is provided a plurality of pipes 20 (FIG. 2) which are interconnected to form a continuous flow passage for the expansible fluid through housing 16 and from an inlet conduit 22 to an outlet conduit 24. Inlet conduit 22 is in communication with the expansible fluid in a reservoir or storage tank 10 and delivers such fluid therefrom for flow through pipes 20 and through outlet conduit 24. The expansible fluid flowing through the sealed housing 16 is thus heated, expanded and pressurized by the sun's energy impinging on surface 18 and the pipes 20 therewithin and changes state from a liquid to a highly pressurized gas. In order to increase the efficiency of heat absorption by the expansible fluid within the solar heat generator 12, the interior surface of housing 16 and the exterior surfaces of pipes 20 are preferably colored black.

As illustrated in FIG. 1, the high pressure gas flowing through conduit 24 drives motor 14. As indicated previously, motor 14 is preferably a sealed turbine having a lubricating port 15. The gases exhausted from motor 14 are returned to the storage tank 10 via a return conduit 26.

The motor 14 is operably connected to a water pump 28. Water pump 28, in turn, has an inlet conduit connected to a lower water reservoir 32 and an outlet conduit 34, in communication with an upper water reservoir 36. Thus, turbine 14 drives water pump 28 and pump 28, in turn, pumps water from the lower reservoir 32 through the conduits 30 and 34 for delivery to the upper reservoir 36. To generate hydro-electricity, an outlet conduit 38 lies in communication between the upper reservoir 36 and a hydro-electric generator 40 located at an elevation below the upper reservoir 36. The water flowing through the hydro-electric generator 40 is returned to the lower reservoir 32 via a conduit 42. Electrical transmission lines are schematically illustrated at 44 for transmitting the electrical energy generated by the hydro-electric generator 40 to distant users thereof.

To operate the system hereof, the expansible fluid flows into the pipes 20 of the solar heater 12 from reservoir 10 via inlet conduit 22. The sun's energy heats, expands and pressurizes the fluid in pipes 22 while in heater 12 with the result that the liquid is expanded into a high pressure gas for delivery via conduit 24 to motor 14. The gas drives motor 14 and the latter, in turn, drives water pump 28 whereby water is pumped from the lower reservoir 32 via conduits 30 and 34 into the upper reservoir 36. The flow of water from the upper reservoir through the hydro-electric generator 40 generates electrical energy which is transmitted along lines 44 to distant users, the water flowing through generator 40 returning to the lower reservoir 32 via conduit 42.

The gas exhausted from motor 14 flows through conduit 26 for return to reservoir 10. As illustrated in FIG. 1, conduit 26 lies in heat exchange relation with the water flowing in conduit 34 for delivery to the upper reservoir. This is a significant feature hereof in that the upper reservoir provides a very large heat sink for the heat taken from the gas as it changes state and is returned to liquid form for storage in storage tank 10. Moreover, the heat from the exhaust gases is removed substantially immediately after the gases are exhausted from the turbine. Preferably, the return conduit 26 for the exhaust gases lies concentrically within conduit 34 and thus gives off heat along its height. Sufficient force is generated by the residual pressure of the expansible fluid as it is exhausted from the turbine to drive the gas upwardly along conduit 26 for return to storage tank 10. It will be appreciated that the conduit 26 is in a form for maximizing heat exchange, i.e., coiled. Also, it will be appreciated that the return conduit 26 may lie in heat exchange relation with either one of the upper or lower reservoirs 36 and 32, respectively, or both.

A further significant feature hereof is the avoidance of the use of pumps to maintain the pressure in the expansible fluid system. This is accomplished by providing a storage tank 10 having a sufficient column height to offset the pressure of the expansible fluid as it is heated, expanded and pressurized in the solar heat generator 12. That is, the column height of the fluid in storage tank 10 is sufficient to counteract the pressure developed in the pipes 20 through the heating of the expansible fluid by solar energy.

While a number of different expansible fluids can be utilized in the system hereof, ammonia, Refrigerant 717 is preferably utilized. Criteria for the selection of the expansible fluid include the development of a large pressure differential for a small change in temperature. Ammonia, among other expansible fluids, satisfies this requirement. For example, for a temperature differential of 80°F., i.e., from 80°F. to 160°F. there is produced in the present system a pressure differential of about 350 p.s.i., i.e., from a pressure of about 138 p.s.i. at 80°F. to a pressure of 490 p.s.i. at 160°F. A working presure of approximately 350 p.s.i. is desirably maintained in the turbine 14.

It will, of course, be appreciated that the temperature inside solar heat generator 12 is quite high, for example on the order of 270°F., and that a pressure of about 1624 p.s.i. is thereby developed. In order to prevent the system pressure from exceeding the maximum safe strength of the piping, etc., a relief conduit 48 lies in communication between heat generator 12 and the outlet conduit 26 which as will be recalled lies in heat exchange relation with the water flowing through conduit 34. A normally closed relief valve 50 is disposed in relief conduit 48. Valve 50 is opened only in response to a fluid pressure in heat generator 12 in excess of a predetermined pressure whereby high pressure gas is quickly vented directly to the heat exchanger for cooling and consequent reduction of system pressure.

In order to eliminate use of excessively strong joints and parts, tubing etc. in the system, which use could render the cost of the system excessive, the present invention provides a device for maintaining the pressure in the system below a specified pressure lower than the predetermined pressure at which relief valve 50 will open, by controlling the heat in heat generator 12. To accomplish this, the present invention provides a cylinder 52 in communication via a conduit 54 with the high pressure gas flowing through conduit 24. In conduit 54, there is provided a valve 56 which admits fluid under pressure into the lower end of cylinder 52. Carried by the piston associated with cylinder 52 is a sun shade or shield 58 located in relation to heat generator 12 and the sun's rays such that when fully extended it can block the sun's rays from impingement on the solar heat generator 12. The shield 58 is thus raised or lowered in accordance with the pressure in the system.

A further feature hereof provides a water flow conduit 60 in communication between the upper and lower reservoirs 36 and 32, respectively. In this manner, controls for the pump and heat generator 12 are eliminated in the event that electrical demand is lower and high pumping rates continue over a period of time.

With respect to the solar heater 12, a glass cover 18 need not be utilized. Instead, a thin, heat conductive material, such as aluminum, may be utilized. The material is preferably colored black. This has significant advantages over the use of glass particularly in large scale use of the system hereof for example where the surface area required for the solar heat generator may comprise many acres. A thin conductive metal is also more easily handled and worked, particularly when an airtight chamber is necessary as in the case of solar heat generator 12. Regarding the reservoirs, it will be appreciated that the reservoirs may be natural or artificially made. A practical size of each reservoir may constitute a five acre lake of water.

From the foregoing, it will be appreciated that the objects of the present invention are fully accomplished. Particularly, it will be noted that the generation of electricity is constant since the water continuously flows from the upper reservoir to the lower reservoir through the hydro-electric generator while simultaneously the water is pumped from the lower reservoir to the upper reservoir. Even during those periods when the sun's rays are interruped for example due to heavy clouds or different seasons of the year, the water flows continuously through generator 40. The reservoirs are thus preferably sized to contain water sufficient to generate electricity from generator 40 for periods of time in excess of the anticipated periods of interruption of the sun's rays. Furthermore, it will be appreciated that the larger the pressure differential on the opposite sides of the turbine the greater the efficiency thereof. Consequently, with the gases exhausting from the turbine directly into the conduit 26 which lies in heat exchange relation with water flowing from the lower to the upper reservoir, the gases are immediately cooled thus enlarging the pressure difference. The foregoing is further accomplished without the use of a large number of controls, motors, pumps and the like which in themselves utilize up the useful energy produced by the system.

The invention may be embodied in other specific forms without departing from the spirit or essential characteristics thereof. The present embodiment is therefore to be considered in all respects illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for converting solar energy into electrical energy comprising a reservoir for containing an expansible fluid, a solar heat generator, a first conduit means in communication between said reservoir and said heat generator for delivery of the expansible fluid from said reservoir to said heat generator, said heat generator being responsive to solar energy to heat the fluid delivered thereto, discrete upper and lower reservoirs for containing water, means in communication between said upper and lower reservoirs including a pump for pumping water from said lower reservoir to said upper reservoir, a motor, second conduit means in communication between said heater and said motor for delivery of the heated fluid to said motor for driving the latter, means coupled between said motor and said pump whereby said pump is driven by said motor thereby enabling said pump to pump water from said lower reservoir to said upper reservoir, a hydro-electric generator at an elevation lower than said upper reservoir, means in communication between said upper reservoir and said generator for delivery of water from said upper reservoir to said generator thereby enabling said generator to produce electrical energy. A third conduit means in communication with said motor and said fluid reservoir for returning the fluid from said motor to said fluid reservoir, said solar heat generator including a closed container, a plurality of pipes in communication one with the other for carrying the expansible fluid and lying within said container whereby the fluid is adapted to be heated by solar energy from the sun, said third conduit means including means for cooling the fluid flowing from said motor, a relief conduit in communication with the fluid in said heat generator and said third conduit means, a valve in said relief conduit for flowing fluid from said heat generator to said third conduit means in response to a fluid pressure in said heat generator in excess of a predetermined pressure, a solar energy shield for reducing the amount of solar energy received by said solar heat generator, means for deploying said shield at least in partial overlying relation to said container to reduce the amount of solar energy received by said solar heat generator and in response to a fluid pressure in said heat generator in excess of a specified pressure, said specified pressure constituting a fluid pressure below said predetermined fluid pressure.

2. Apparatus according to claim 1 wherein said reservoir, said first conduit means, said solar heat generator, said second conduit means, said motor, and said third conduit means constitute a closed fluid system.

3. Apparatus according to claim 1 wherein said third conduit means and the means in communication between the upper and lower reservoirs lie in heat exchange relationship one with the other.

4. Apparatus according to claim 1 including a conduit in communication between said upper and lower reservoirs for carrying water overflow from said upper reservoir to said lower reservoir.

* * * * *